United States Patent
Liu et al.

(10) Patent No.: US 8,363,278 B2
(45) Date of Patent: Jan. 29, 2013

(54) METHOD AND APPARATUS CAPABLE OF PRODUCING FM HALFTONE DOTS IN HIGH SPEED

(75) Inventors: Zhihong Liu, Beijing (CN); Feng Chen, Beijing (CN); Bin Yang, Beijing (CN)

(73) Assignees: Peking University Founder Group Co., Ltd., Beijing (CN); Beijing Founder Electronics Co., Ltd., Beijing (CN); Peking University, Beijing (CN)

( * ) Notice: Subject to any disclaimer, the term of this patent is extended or adjusted under 35 U.S.C. 154(b) by 1122 days.

(21) Appl. No.: 11/918,077

(22) PCT Filed: Mar. 31, 2006

(86) PCT No.: PCT/CN2006/000567
§ 371 (c)(1),
(2), (4) Date: Oct. 9, 2007

(87) PCT Pub. No.: WO2006/105721
PCT Pub. Date: Oct. 12, 2006

(65) Prior Publication Data
US 2009/0051972 A1 Feb. 26, 2009

(30) Foreign Application Priority Data
Apr. 7, 2005 (CN) .......................... 2005 1 0063255

(51) Int. Cl.
*G06K 15/00* (2006.01)
*G06K 9/00* (2006.01)
*G03G 13/04* (2006.01)

(52) U.S. Cl. ...... 358/3.03; 358/1.9; 358/3.04; 358/3.05; 358/3.06; 358/3.22; 358/534; 358/536; 382/172; 382/252; 382/270; 347/131; 347/254

(58) Field of Classification Search ................. 358/3.24, 358/3.09; 345/132, 138, 141, 127, 128, 130; 399/180, 181
See application file for complete search history.

(56) References Cited

U.S. PATENT DOCUMENTS 5,917,614 A * 6/1999 Levien .......................... 358/3.03
5,946,455 A 8/1999 Tresser et al.
(Continued)

FOREIGN PATENT DOCUMENTS

| JP | 06-098159 | 4/1994 |
| JP | 09-135348 | 5/1997 |

(Continued)

OTHER PUBLICATIONS

Japanese Office Action dated Jul. 10, 2009. Wang, Dong-Xing et al., Halftoning colour volume datasets based on subdivision, Elsevier, Computer-Aided Design, 2004, pp. 1371-1377, vol. 36.

*Primary Examiner* — Steven Kau
(74) *Attorney, Agent, or Firm* — Lowe Hauptman Ham & Berner LLP

(57) ABSTRACT

The present invention relates to a method and apparatus capable of generating frequency-modulation halftone dots in high speed and belongs to the field of the digital image halftone. In the prior art, read-write operation is usually carried out many times in error rows during processing each pixel so that halftone dots are generated in low speed. In the method according to the present invention, the error generated by the current pixel is buffered in a register file and the final accumulated error values are written in the error rows only after all of the relative pixels are processed. Thus, read-write operation is carried out only once in the error rows for processing each pixel. The present invention also provides an apparatus to implement the method. The apparatus comprises an error row memory, an error buffer register file, a gray generation circuit, a threshold comparison circuit, an error generation circuit, an error buffer register file control circuit, and an error row control circuit. The method and apparatus according to the present invention decrease the steps in operation and improve the speed for generating the frequency-modulation halftone dots.

10 Claims, 4 Drawing Sheets

U.S. PATENT DOCUMENTS

| | | | |
|---|---|---|---|
| 5,974,228 A * | 10/1999 | Heitsch | 358/1.9 |
| 7,034,964 B2 * | 4/2006 | Suzuki | 358/3.06 |
| 2001/0021275 A1 | 9/2001 | Nose | |
| 2002/0054354 A1 | 5/2002 | Fukao | |
| 2004/0130753 A1 | 7/2004 | Crounse | |
| 2006/0290989 A1 * | 12/2006 | Kobayashi | 358/3.03 |

FOREIGN PATENT DOCUMENTS

| | | |
|---|---|---|
| JP | 11-157132 | 6/1999 |
| JP | 2002-094790 | 3/2002 |
| JP | 2002-185788 | 6/2002 |

* cited by examiner

|  | * | 7/16 |
|---|---|---|
| 3/16 | 5/16 | 1/16 |

Fig. 1

|  |  | * | D5 | D3 |
|---|---|---|---|---|
| D2 | D4 | D5 | D4 | D2 |
| D1 | D2 | D3 | D2 | D1 |

Fig. 2

| (0, 0) | (0, 1) | (0, 2) | (0, 3) | (0, 4) | (0, 5) | (0, 6) |
|---|---|---|---|---|---|---|
| (1, 0) | (1, 1) | (1, 2) | (1, 3) | (1, 4) | (1, 5) | (1, 6) |
| (2, 0) | (2, 1) | (2, 2) | (2, 3) | (2, 4) | (2, 5) | (2, 6) |

Fig. 3

| (0, 0) | (1, 0) | (2, 0) | (3, 0) | (0, 1) | (1, 1) | (2, 1) | (3, 1) |
|---|---|---|---|---|---|---|---|
| (0, 2) | (1, 2) | (2, 2) | (3, 2) | (0, 3) | (1, 3) | (2, 3) | (3, 3) |
| (0, 4) | (1, 4) | (2, 4) | (3, 4) | (0, 5) | (1, 3) | (2, 5) | (3, 5) |
| (0, 6) | (1, 6) | (2, 6) | (3, 6) | | | | |

| P1D1 | P2D1 | P3D1 | P4D1 | P5D1 |
|------|------|------|------|------|
| P1D2 | P2D2 | P3D2 | P4D2 | P5D2 |
| P1D3 | P2D3 | P3D3 | P4D3 | P5D3 |
| P1D4 | P2D4 | P3D4 | P4D4 | P5D4 |
| P1D5 | P2D5 | P3D5 | P4D5 | P5D5 |
|      |      | P3L1 | P4L1 | P5L1 |
Fig. 6
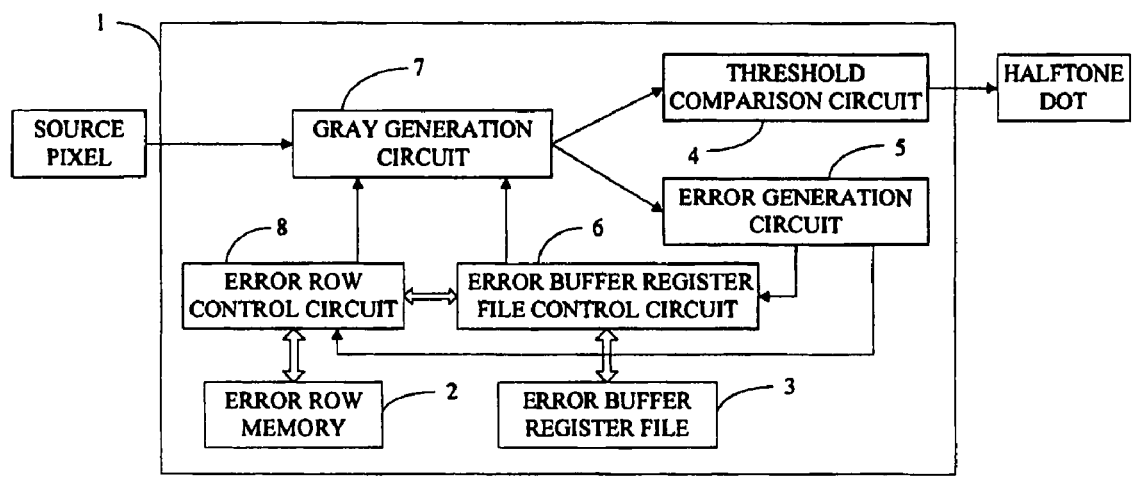
Fig. 7
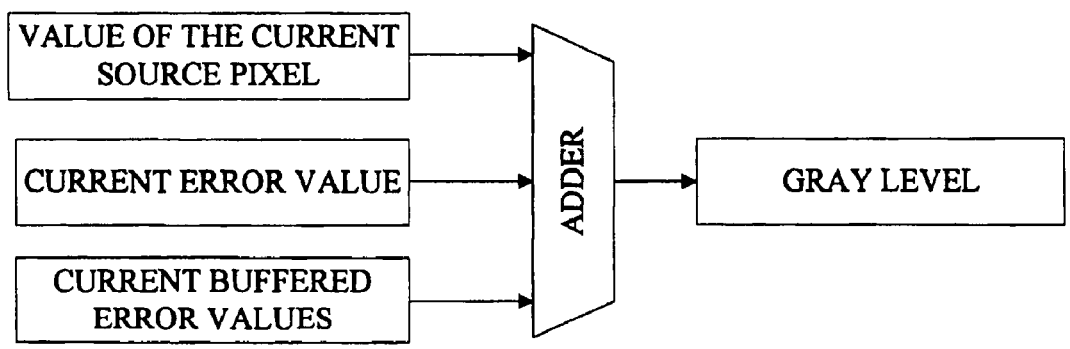
Fig. 8

METHOD AND APPARATUS CAPABLE OF PRODUCING FM HALFTONE DOTS IN HIGH SPEED

FIELD OF THE INVENTION

The present invention relates to a method and apparatus for producing halftone dots in the field of the digital image halftone, more particularly to a method and apparatus capable of producing frequency-modulation (FM) halftone dots in high speed.

BACKGROUND OF THE INVENTION

The technology of digital image halftone comprises amplitude-modulation screening and frequency-modulation screening. Error Diffusion method is widely used in the common frequency-modulation screening method. In Error Diffusion method, while halftone dots are produced by comparing the gray level of each dot of the original image with a threshold, the difference between the gray level of each dot and the threshold is diffused to adjacent dots. For example, in an image with 256 gray levels, the threshold is set as 127. After comparing, a dot whose gray level is 150 will be a white dot. However, this dot should not be purely white because there is a difference between the gray levels of the dot and a white dot. The error value 23 is diffused to adjacent dots around the dot by a certain means.

Floyd-Steinberg Algorithm is a most well-known and common algorithm for Error Diffusion method. Using the algorithm, after the gray level of the current dot is compared with a threshold, the gray level of the dot is set as 1 or 0 (i.e. the dot is set as a black or white dot). Then, the error is obtained by calculating the difference between the gray level and the threshold. Finally, the error is distributed to adjacent dots to adjust the gray levels of the adjacent dots. Specially, by Floyd-Steinberg Algorithm, $7/16$ of the error value is added to a dot adjacent to and on the right side of the current dot, $5/16$ of the error value is added to a dot in the next row, which corresponds to the current dot, $3/16$ of the error value is added to a dot, which is adjacent to and on the left side of the dot corresponding to the current dot in the next row, and $1/16$ of the error value is added to a dot, which is adjacent to and on the right side of the dot corresponding to the current dot in the next row. Following this way, the error of the current dot is distributed to the adjacent dots. This process is implemented to every dot in the image for halftoning and revising the gray levels.

Some improved algorithms such as Stucki Algorithm have arisen on the basis of Floyd-Steinberg Algorithm. Using Stucki Algorithm, the error generated by the current dot is distributed to twelve adjacent dots of the current dot. The output image has a better effect because more dots are related to during the distribution. Furthermore, during distributing the errors, if dots in each row are processed from left to right the errors from each row are simply added to those in its next row so that the errors are heaped. This will cause the output image to have a tendency in the sense of sight. To obtain a good effect, an S-shaped scan is used during scanning. Specifically, for the whole image, the odd rows are scanned from left to right and the even rows are scanned from right to left.

Generally, Error Diffusion method can result in a good effect. However, its shortcoming is obvious. The method will induce large numbers of calculations and operations in a memory so that the dots are produced in low speed. For example, using Stucki Algorithm with an S-shaped scan, a memory commonly called an error row memory is generally used to store the results in the current row and next two rows after error diffusion. Each position in error rows denotes an accumulated error value of the corresponding position. Thus, the original accumulated error values corresponding to the current pixel and the twelve adjacent positions in the error rows are needed to be read out for processing every pixel. After the calculated error value of the current pixel is obtained, the value is distributed to the twelve adjacent positions. Each distributed value is added to the original accumulated error value on the corresponding position and the results are respectively written in the twelve positions in the error rows. It can be seen that the prior method requires many operations in the memory. The read-write speed of a memory is the bottleneck of a computer system. Therefore, the scope of applying the screening method based on Error Diffusion is limited because of its processing speed while it can improve the output effect. Although special hardware is commonly used to improve the speed for producing dots in the method based on Error Diffusion, because of the a plurality of operations in the memory, the speed is impacted and hard to satisfy requirements of high-speed printers and duplicating machines having real-time feature so that the screening method based on Error Diffusion is hard to apply to modern high-speed printers and duplicating machines.

SUMMARY OF THE INVENTION

To overcome the shortcomings of the prior art, the present invention is to provide a method and an apparatus capable of producing frequency-modulation halftone dots in high speed. When processing every pixel, the apparatus accesses error row memory with only one reading operation and one writing operation so as to improve the speed for producing frequency-modulation halftone dots.

In order to accomplish the above object, the present invention provides a method capable of producing frequency-modulation halftone dots in high speed, comprising:
  a) organizing in column and initializing an error row memory;
  b) setting an error buffer register file;
  c) obtaining a current source pixel;
  d) producing a halftone dot based on the current source pixel, error rows and the error buffer register file;
  e) updating the error rows and the error buffer register file;
  f) repeating the steps (c), (d) and (e) until a current row is processed completely; and
  g) repeating the steps (b), (c), (d), (e) and (f) until an image is processed completely.

Further, to improve the effect of the present invention, the step (a) further comprises:
  1) setting a number of the error rows as $2^n$, wherein a width of a bus of the error row memory allow the number $2^n$ of elements can be synchronously read or written from the error row memory, the number of the error rows is not less than the number of rows which errors from one pixel can be distributed to, the error rows are used repeatedly, and the n is a positive integer;
  2) arranging each of $2^n$ columns of error positions adjacent, which in a same column have an identical number; and
  3) initializing the error rows as 0.

Further, to improve the effect of the present invention, the step (b) further comprises:
  1) setting the error buffer register file to include an error distribution buffer register file and an error accumulation buffer register file, wherein the error distribution buffer register file is sufficient to store all of error distribution values from all of the relative pixels of a certain position in the error rows, current relative pixels is set as all of pixels in a current operating row, whose error values can be distributed to this position in the error rows, the error accumulation buffer register file is sufficient to store all of relative accumulated error values of original error rows following the current operating row, the relative accumulated error values are set as all of read original accumulated error values in the error rows in a course from reading out the original accumulated error value of a certain position in the error rows to writing in a new accumulated error value of the position; and 2) initializing the error buffer register file, wherein the error buffer register file are initialized as 0 at a time of starting to process each row.

Further, to improve the effect of the present invention, the step (d) further comprises:

1) reading synchronously accumulated error values corresponding to a position of the current source pixel and the position in a next row and a same column out from the error row memory;

2) calculating a sum S of error values of the current source pixel, which come from distribution of errors generated by all of preceding pixels in the same row, in light of the error buffer register file; and 3) obtaining a final value of the pixel by adding an original accumulated error value of the position corresponding to a current pixel, the S and the value of the current source pixel together and producing a final halftone dot by comparing the final value with a threshold.

Further, to improve the effect of the present invention, the step (e) further comprises:

1) obtaining values $D_j$ for all of adjacent pixels, which is caused by distribution of the error generated by a current pixel, in light of a final value of the pixel and a threshold;

2) updating an error distribution value of each pixel in the error distribution buffer register file as that of its next pixel and updating that of a last pixel as the value $D_j$;

3) updating an accumulated error value of each pixel in the error accumulation buffer register file as that of its next pixel and updating that of the last pixel as an original accumulated error value of the position which corresponds to the current pixel and is in a next row; and 4) obtaining all of written data values in one column in the error rows in light of the error buffer register file and synchronously writing the written data values into the error row memory, wherein the written data value of a certain position in a column in the error rows equals to a sum of the original accumulated error value of this position and all of the error distribution values distributed to this position, which are stored in the error buffer register file.

In order to accomplish the above method, the present invention also provides an apparatus using hardware circuits. The apparatus 1 comprises the error row memory 2, the error buffer register file 3, a threshold comparison circuit 4 and an error generation circuit 5, an error buffer register file control circuit 6, a gray generation circuit 7, and an error row control circuit 8;

further, the error row memory 2 is used for storing results of error diffusion during processing; the error buffer register file 3 is used for buffering intermediate error values; the gray generation circuit 7 is coupled to the source pixels, the error row memory 2 and the error buffer register file 3 and used for generating final gray Level of the source pixels after the error diffusion;

the threshold comparison circuit 4 is connected to the gray generation circuit 7 and compares the final gray level with a threshold to produce final halftone dots; the error generation circuit 5 is connected to the gray generation circuit 7 and works out current error distribution values in light of the threshold and the final gray level; the error buffer register file control circuit 6 is used for controlling update and output of the error buffer register file, input of the error buffer register file control circuit 6 comes from feedback of the error generation circuit 5, the error row control circuit 8 and the error buffer register file 3; the error row control circuit 8 is coupled to the error row memory 2 and used for generating read-write addresses, read-write controlling signals and read-write data for the error row memory, the input of the error row control circuit 8 comes from coordinates including the current operating pixel, the error buffer register file control circuit 6 and the error generation circuit 5;

when the apparatus is in operation, the final pixel gray level is obtained by the gray generation circuit 7 in light of the current operating pixel, the error row memory 2 and the error buffer register file 3. Then, the halftone dot is produced by the threshold comparison circuit 4 and the error distribution values corresponding to this pixel are obtained by the error generation circuit 5 for the final pixel gray level. After that, the error buffer register file 3 and the error row memory 2 are updated by the error buffer register file control circuit 6 and the error row control circuit 8, respectively.

Further, to improve the effect of the present invention, in the apparatus, the error buffer register file comprises triggers and includes an error distribution buffer register file and an error accumulation buffer register file, the error distribution buffer register file is sufficient to store all of error distribution values from all of the relative pixels of a certain position in the error rows, current relative pixels is set as all of pixels in a current operating row, whose error values can be distributed to this position in the error rows, the error accumulation buffer register file is sufficient to store all of relative accumulated error values of original error rows following the current operating row, the relative accumulated error values are set as all of read out original accumulated error values in the error rows in a course from reading out the original accumulated error value of a certain position in the error rows to writing in a new accumulated error value of the position.

Further, to improve the effect of the present invention, in the apparatus, the gray generation circuit comprises an adder, the input of the adder comes from the source pixels, current error values read out from the error rows and current buffered error values in the error buffer register file; the gray generation circuit obtains the final gray level of the current pixel by adding the value of the current source pixel, the error value corresponding to the pixel, which is read out of the error rows, and the buffered error values in the error buffer register file, which is generated by the preceding pixels in the row having the current pixel for the current pixel, together.

Further, to improve the effect of the present invention, in the apparatus, the error buffer register file control circuit comprises a number n of multiplexers, n is the number of the registers in the error buffer register file, the multiplexers are used for generating the input of the error buffer register file and control signals to implement an update for the error buffer register file and the initialization (zero clearing) at the time of starting each row in each period of processing pixels, the input of the multiplexers comprises the current error distribution values, the current accumulated error values and original values in the error buffer register file, the output of the multiplexers is updated values of the registers in the error buffer register file.

Further, to improve the effect of the present invention, in the apparatus, the error row control circuit comprises a read address register, a write address register, a read-write control circuit and a write-in data generation circuit, the read address register and the write address register are generated by a column number of the current pixel, the write-in data generation circuit comprises adders, the input of the adders comes from original accumulated error values, the current error distribution values and relative buffered error values.

The present invention has the following effects. In the field of the digital image halftone, when the frequency-modulation halftone dots are produced by using the method based on Error Diffusion, the method and apparatus operate the memory with only one reading operation and one writing operation in the course of processing every pixel. Moreover, the method and apparatus can be implemented by using special hardware circuits. Thus, the speed for producing frequency-modulation halftone dots is improved.

BRIEF DESCRIPTION OF THE DRAWINGS

FIG. 1 is a diagram illustrating the principle of Error Diffusion based on Floyd-Steinberg Algorithm;

FIG. 2 is a diagram illustrating the principle of Error Diffusion based on Stucki Algorithm;

FIG. 3 is a diagram illustrating an error row memory with a 7-pixel wide image, generally based on Stucki Algorithm;

FIG. 6 is a diagram illustrating an error buffer register file based on Stucki Algorithm according to the method of the present invention;

FIG. 7 is a block diagram illustrating the apparatus for producing FM halftone dots in high speed according to the present invention;

FIG. 8 is a block diagram illustrating the gray generation circuit in the apparatus for producing FM halftone dots in high speed according to the present invention;

DESCRIPTION OF THE PREFERRED EMBODIMENTS

Hereinafter, a detailed description of the present invention will be given with reference to the appended drawings and embodiments.

FIG. 1 is a diagram illustrating the principle of Error Diffusion based on Floyd-Steinberg Algorithm. The error of a current pixel * is distributed to four adjacent pixels shown in FIG. 1.

FIG. 2 is a diagram illustrating the principle of Error Diffusion based on Stucki Algorithm. The error of a current pixel * is distributed to twelve adjacent pixels shown in FIG. 2. In general, some of these twelve positions have the same error distribution ratio. The algorithm shown in FIG. 2 only needs five different error distribution ratios, wherein the error of the current pixel * can be distributed at a rate of $D_1=1/44$, $D_2=2/44$, $D_3=5/44$, $D_4=4/44$, and $D_5=8/44$. Generally, when this algorithm and the S-shaped scanning process are adopted, error rows are needed to store accumulated error distribution values for the following two rows from the current pixel. Thus, three error rows are needed and the width of the rows equals to that of the source image. It is understandable that a plurality of read-writing operations is needed to update the accumulated error values on the twelve positions in the error row memory when a pixel is processed.

FIG. 3 is a diagram illustrating an error row memory with a 7-pixel wide image based on Stucki Algorithm, wherein (i, j) denotes a pixel at a position of row i and column j in the error rows. It is known that the error rows based on Stucki Algorithm can be used repeatedly. Therefore, only three error rows are needed, wherein the pixels in $i^{th}$ row and those in $(i+3)^{th}$ row use the same error row.

Figures 4, 5:
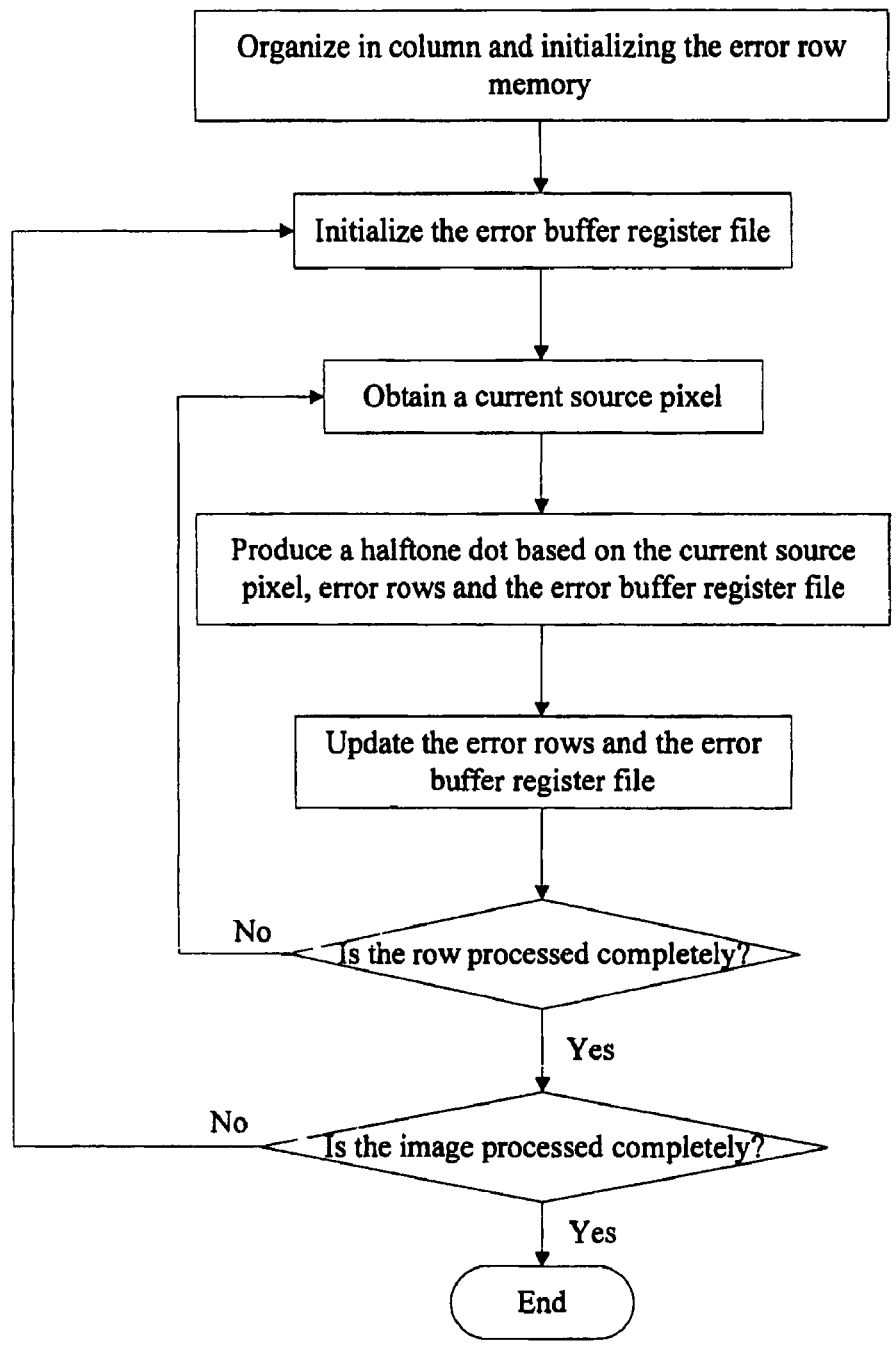
FIG. 4 is a flowchart of processing an image according to the method of the present invention.
FIG. 5 is a diagram illustrating an error row memory with a 7-pixel wide image based on Stucki Algorithm according to the method of the present invention.

As shown in FIG. 4, the present invention provides a method capable of producing FM halftone dots in high speed for an image with following steps of:
(1) organizing in column and initializing the error row memory;
(2) setting the error buffer register file;
(3) obtaining a current source pixel;
(4) producing a halftone dot based on the current source pixel, error rows and the error buffer register file;
(5) updating the error rows and the error buffer register file;
(6) judging whether one row is completely processed. If not, the process is turned to the step (3), otherwise, implementing the step (7); and
(7) judging whether the image is completely processed. If not, the process is turned to the step (2), otherwise, the process is ended.

FIG. 5 is a diagram illustrating an error row memory based on Stucki Algorithm in step (1), wherein the image has a 7-pixel width and (i, j) denotes a pixel at a position of row i and column j in the error rows. In conventional computer systems, the width of a data bus of a memory is generally the $n^{th}$ power of 2 (n is a certain integer) such as 16, 32, 64, and so on. Therefore, number of the error rows used in the present invention is defined as the $n^{th}$ power of 2. Specifically, for the method based on Stucki Algorithm, 4 error rows is needed and they are used repeatedly, namely, the pixels in $i^{th}$ row and those in $(i+4)^{th}$ row use the same error row. Furthermore, as shown in FIG. 5, the difference between the method of present invention and that in the prior art is that the error rows in the method of the present invention are organized in column (i.e. four columns of elements of the error rows which in the same column have an identical number are arranged adjacently) so that all the accumulated error values in same column in the error rows can be synchronously read or written with the error row memory having a 32-bit bus width.

FIG. 6 is a diagram illustrating an error buffer register file based on Stucki Algorithm in the step (2), including all of the error distribution values of the current operating pixel and some preceding correlative pixels in the current operating row, and the values of several original error rows following the current operating row. For example, as Stucki Algorithm shown in FIG. 2, since the error on a certain position in the error rows may come from at most five pixels in the current row, the error buffer register file should store all of the error distribution values of the five adjacent pixels in the row. Moreover, since the error of the current operating pixel can be distributed only to the preceding two pixels in the next two rows, it is understandable that only the final error values in the next row behind the current row are relative to the original values in the error row memory and the error values in the row behind the next row equal to 0 before the current row is processed. Writing the final accumulated error value on a certain position of the row next to the current row is implemented after the error rows corresponding to the following two pixels are read out. In this course, the read error rows have three original accumulated error values. Therefore, only three original values of the error rows in the next row are needed to be stored in the error buffer register file. In the present embodiment, as shown in FIG. 6, the error buffer register file is able to buffer all of the error distribution values of the adjacent five pixels and the three original values of the error rows in the next row, wherein $P_5$ is set as the current operating pixel, $P_iD_j$ (i,j=1 ... 5) respectively denote all of the error values of $P_5$ and its four preceding adjacent pixels in the same row, and $P_iL_1$ (i=3, 4, 5) respectively denote the original accumulated error values of the row following the row at which the read position $P_i$ locates in the error row memory.

In the method of the present invention, the step (4) producing a halftone dot in light of the current source pixel, the error rows and the error buffer register file comprises the following steps.

1) Accumulated error values corresponding to the position of the current source pixel and the position in the next row and the same column are synchronously read out from the error row memory. Since the error rows are organized in column and the number of the error rows matches the bus width of the error row memory, a read address register and a write address register are obtained in light of the column number of the current operating pixel. For example, as Stucki Algorithm shown in FIG. 2, assuming that the column number of the current operating pixel is j, the read address register is 4*j. Since there are four error rows to be used repeatedly, after the error rows are read out, the original accumulated error value $L_0$ corresponding to the current operating pixel in the error rows is obtained according to the last two digits of the row number of the current operating pixel. The value corresponding to the pixel in the next row in the error rows is set as $L_1$.

2) A sum S of the error values of the current source pixel, which come from the distribution of errors generated by all of the preceding pixels in the same row, is calculated according to the error buffer register file. As FIG. 2 shows, $S=P_5D_5+P_4D_3$ according to Stucki Algorithm.

3) The final value of the pixel is obtained by adding the original accumulated error value $L_0$ of the position corresponding to the current pixel to S and the value of the current source pixel together. The final halftone dot is produced by comparing the value with a threshold.

In the method of the present invention, step (5) further comprises the following steps.

1) Values $D_j$ for all the adjacent pixels, which is caused by the distribution of the error generated by the current pixel, are obtained in light of the final value of the pixel and the threshold. As Stucki Algorithm shown in FIG. 2, the distribution ratios are $D_1=1/44$, $D_2=2/44$, $D_3=5/44$, $D_4=4/44$, and $D_5=8/44$.

2) The error distribution value of each pixel in the error distribution buffer register file is updated as that of its next pixel and the value of the last pixel is updated as $D_j$. As Stucki Algorithm shown in FIG. 2, $P_iD_j$ is assigned as $P_{i+1}D_j$ and $P_5D_j$ is assigned as $D_j$ (i=1 ... 4, j=1 ... 5).

3) The accumulated error value of each pixel in the error accumulation buffer register file is updated as that of its next pixel and the value of the last pixel is updated as the original accumulated error value on the position which corresponds to the current pixel and is in the next row.

For example, as Stucki Algorithm shown in FIG. 2, $P_iL_1$ is assigned as $P_{i+1}L_1$ (i=3, 4) and $P_5L_1$ is assigned as $L_1$.

4) All of the written data values in one column in the error rows are obtained in light of the error buffer register file and synchronously written into the error row memory, wherein the written data value of a certain position in a column in the error rows equals to the sum of the original accumulated error value on this position and all of the error distribution values distributed to this position, which are stored in the error buffer register file. For example, as Stucki Algorithm shown in FIG. 2, assuming that the current operating pixel is $P_5$, the final written data $PL_1$ and $PL_2$ of the column having the pixel before $P_5$ and separated from $P_5$ by one pixel can be obtained, wherein $PL_1=P_3L_1+P_1D_2+P_2D_4+P_3D_5+P_4D_4+P_5D_2$ and $PL_2=P_1D_1+P_2D_2+P_3D_3+P_4D_2+P_5D_1$.

The present invention also provides an apparatus 1 capable of producing FM halftone dots in high speed, as shown in FIG. 7, comprises the following seven components: an error row memory 2, an error buffer register file 3, a threshold comparison circuit 4, an error generation circuit 5, an error buffer register file control circuit 6, a gray generation circuit 7, and an error row control circuit 8.

In the apparatus, the final pixel gray level is obtained by the gray generation circuit 7 in light of the current operating pixel, the error row memory 2 and the error buffer register file 3. Then, the halftone dot is produced by the threshold comparison circuit 4 and the error distribution value corresponding to this pixel is obtained by the error generation circuit 5 for the final pixel gray level. After that, the error buffer register file 3 and the error row memory 2 are updated by the error buffer register file control circuit 6 and the error row control circuit 8, respectively.

In the apparatus, the error row memory 2 which is organized in column for storing accumulated error values is coupled to the control circuit 8 and under the control of the circuit 8.

The error buffer register file 3 comprises hardware triggers configured to buffer intermediate error distribution values. The error buffer register file 3 is coupled to the control circuit 6 and under the control of the circuit 6.

The gray generation circuit 7 is used for generating the final gray level of the source pixel. Its input is coupled to source pixels and the error buffer register file control circuit 6 and its output is provided to the threshold comparison circuit 4 and the error generation circuit 5. FIG. 8 is a block diagram illustrating the gray generation circuit in the apparatus capable of producing FM halftone dots in high speed. The final gray level of each pixels is generated by an adder and equals to the sum of the value of the source pixel, the current error value corresponding to the pixel, which is read out from the error rows, and the current buffered error values in the error buffer register file, which is generated by the pixels preceding to the current pixel in the same row. For example, as Stucki Algorithm shown in FIG. 2, a logical expression for the circuit is: the final gray level of a pixel=the source pixel value+$L_0$+($P_5D_5+P_4D_3$).

The threshold comparison circuit 4 is used for comparing the threshold with the gray level generated by the gray generation circuit 7 to produce halftone dots. The input of the threshold comparison circuit 4 is coupled to the gray generation circuit 7 and the output of the circuit 4 is the final halftone dots.

The error generation circuit 5 is used for generating the error distribution values of the current pixel in light of the gray level generated by the gray generation circuit 7 by means of computing or searching. The input of the error generation circuit 5 is coupled to the gray generation circuit 7 and the output of the circuit 5 is provided to the error buffer register file control circuit 6 and the error row control circuit 8.

Figure 10:
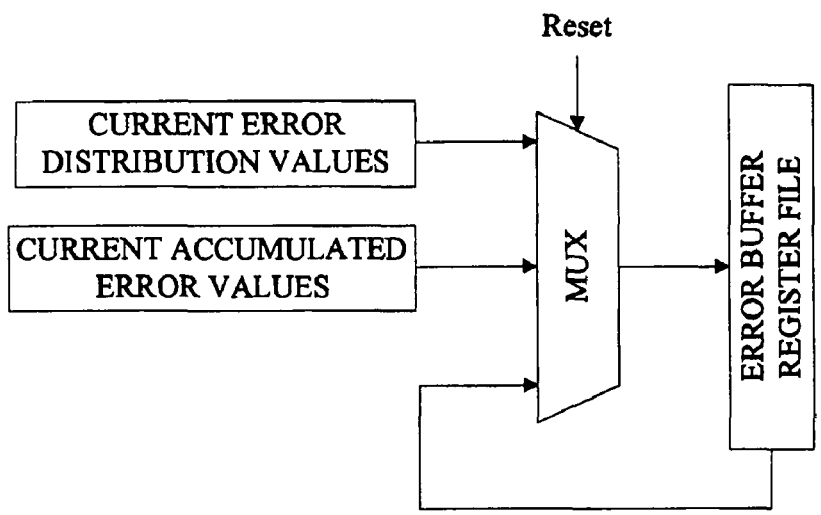
FIG. 10 is a block diagram illustrating the multiplexer in the control circuit for the error buffer register file in the apparatus for producing FM halftone dots in high speed according to the present invention.

The error buffer register file control circuit 6 is used for controlling the update of the error buffer register file. The input of the control circuit 6 is coupled to the error generation circuit 5, the error row control circuit 8 and the error buffer register file 3 and the output of the circuit 6 is coupled to the error row control circuit 8, the error buffer register file 3 and the gray generation circuit 7. FIG. 10 is a block diagram illustrating a multiplexer in the error buffer register file control circuit in the apparatus capable of producing FM halftone dots in high speed. Using n multiplexers, the error buffer register file control circuit updates the error buffer register file after processing one pixel and initializes (zero clearing) at the time of starting each row, wherein n is the number of the registers in the error buffer register file, namely, each register in the error buffer register file corresponds to one multiplexer. The input of one multiplexer comprises all of the error distribution values of the current operating pixel (i.e. the current error distribution values), the current accumulated error values in the next row behind the current operating pixel, which are read out from the error rows, and the original values in the error buffer register file. And, the output of one multiplexer is the updated values in the registers in the error buffer register file. For example, as Stucki Algorithm shown in FIG. 2, after the current error distribution values $D_j$ and the current accumulated error values $L_1$ are obtained, the output of one multiplexer can be denoted as: $P_{i+1}D_j$ corresponding to $P_iD_j$, $D_j$ corresponding to $P_5D_j$ (i=1 ... 4, j=1 ... 5), $P_{i+1}$ corresponding to $P_iL_1$, and $L_1$ corresponding to $P_5L_1$.

Figure 9:
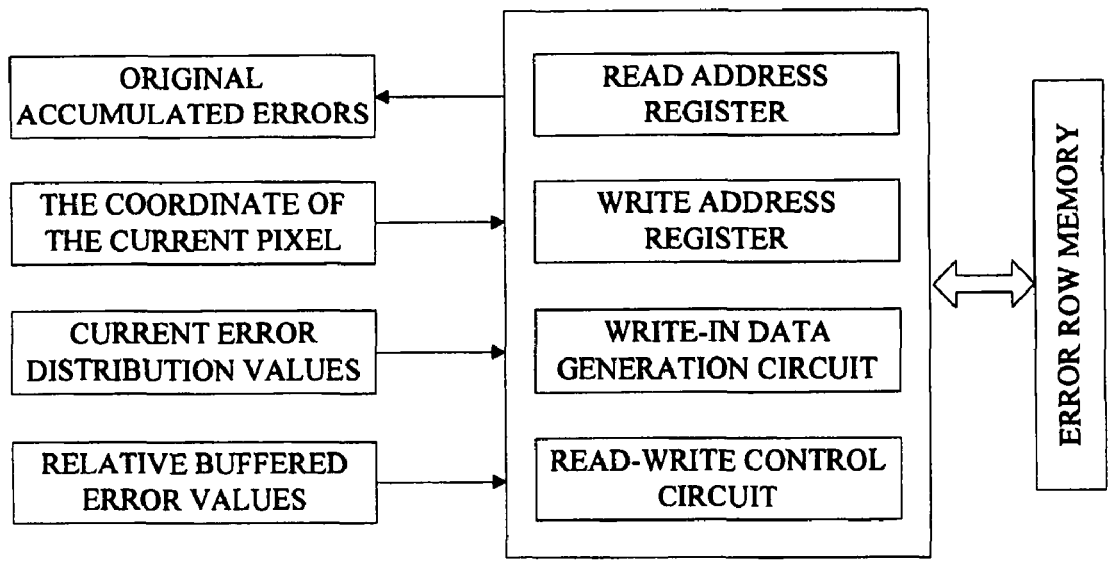
FIG. 9 is a block diagram illustrating the control circuit for the error rows in the apparatus for producing FM halftone dots in high speed according to the present invention.

The error row control circuit 8 is used for controlling the reading and writing of the error row memory 2. The input of the control circuit 8 comes from the error generation circuit 5 and the error buffer register file control circuit 6, and the output is coupled to the gray generation circuit 7. Furthermore, the control circuit 8 is coupled to the error row memory 2. FIG. 9 is a block diagram illustrating the error row control circuit in the apparatus capable of producing FM halftone dots in high speed, comprising a read address register, a write address register, a read-write control circuit and a write-in data generation circuit, wherein the read address register and the write address register are calculated according to the coordinate of the current operating pixel, and the write-in data generation circuit comprises adders. A column of write-in data of the error rows are obtained by the write-in data generation circuit in light of the original accumulated error values, the current error distribution values and the relative buffered error values. The read-write control circuit is used for generating read-write control signals of the error row memory. For example, as Stucki Algorithm shown in FIG. 2, assuming that the column number of the current operating pixel is j, the read address register is 4*j and the write address register is 4*(j−2). A column of write-in data $PL_1$ and $PL_2$ are generated by the write-in data generation circuit of the error rows, wherein $PL_1$ may be denoted as $PL_1=P_3L_1+P_1D_2+P_2D_4+P_3D_5+P_4D_4+P_5D_2$ and $PL_2$ may be denoted as $PL_2=P_1D_1+P_2D_2+P_3D_3+P_4D_2+P_5D_1$.

Figure 11:
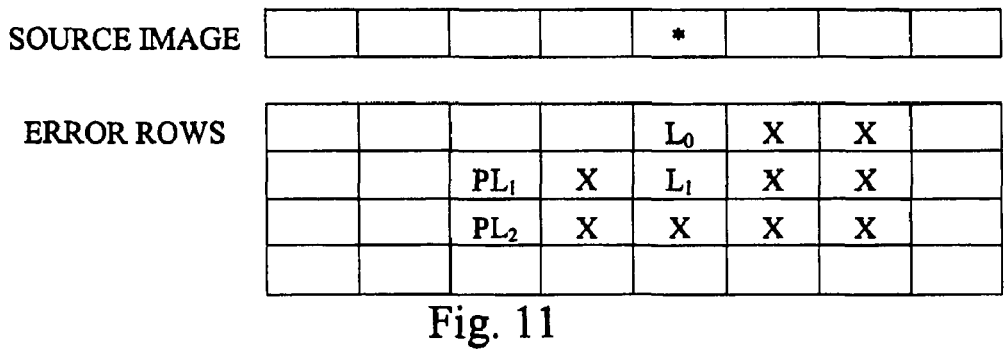
FIG. 11 is a diagram illustrating the read-write process of the error row memory when a pixel is processed according to the method in the present invention.

FIG. 11 is a diagram illustrating the read-write process of the error row memory when a pixel is processed according to the method in the present invention. For example, as Stucki Algorithm shown in FIG. 2, assuming that the symbol * denotes a current operating pixel, if the prior art is used, it is necessary to read out $PL_2$, $PL_1$, $L_0$, $L_1$ and the original contents on all of the positions marked with X in the error rows shown in FIG. 11 when processing the current operating pixel *. After processing the current operating pixel, it is also necessary to update the accumulated values on the twelve positions adjacent to the current pixel. To the contrary, using the method and apparatus provided in the present invention, when processing the current pixel *, $L_0$ and $L_1$ are read out from the error row memory, firstly. The $L_0$ is used for generating the final gray and the $L_1$ is to be buffered for generating $PL_1$ later. After the error distribution values $D_j$ of the current operating pixel are generated, it is understood that the values of $PL_1$ and $PL_2$ in the error row memory may be determined and written in. In the course of processing pixels in the subsequent rows, the contents of the pixels in the error rows will not be changed. Furthermore, since all of the relative error values which change the final accumulated values of $PL_1$ and $PL_2$ are buffered into the error buffer register file, writing $PL_2$ and $PL_1$ may be completed without reading the memory again. The error rows are organized in column according to the present invention. Thus, it only needs one read operation of the memory for reading $L_0$ and $L_1$ and one writing operation of the memory for writing $PL_2$ and $PL_1$. It can be seen that only one read operation of the memory for reading-out $L_1$ and $L_0$ and only one writing operation of the memory for writing-in PL2 and PL1 are needed when processing one pixel, using the method in the present invention. Thus, the speed for producing halftone dots is improved significantly.

The above description is one embodiment of the present invention and not restrictive to the present invention. For example, although the above is described with reference to Stucki Algorithm distributing each error to twelve adjacent positions, the invention is adaptive to methods based on the principle of Error Diffusion for producing halftone dots with the errors distributed to more dots. Thus, without departing from the spirit and principle of the present invention, any modifications, substitutions and improvements should be within the scope of the present invention.

The invention claimed is:

1. A method capable of producing frequency-modulation halftone dots, comprising:
    (a) organizing error rows in columns of an error row memory for storing accumulated error values and initializing an error row memory;
    (b) setting an error buffer register file for storing error distribution values and the accumulated error values;
    (c) obtaining a current source pixel;
    (d) producing a halftone dot based on the current source pixel, the error rows and the error buffer register file;
    (e) updating the error rows and the error buffer register file;
    (f) repeating the steps (c), (d), and (e) until a current row is processed completely; and
    (g) repeating the steps (b), (c), (d), (e), and (f) until an image is processed completely.

2. The method as defined in claim 1, wherein the step (a) comprises:
    setting a number of the error rows as $2^n$, wherein a width of a bus of the error row memory allows the number $2^n$ of elements to be synchronously read or written from the error row memory, the number of the error rows is not less than the number of rows in which errors from one pixel are capable of being distributed to, the error rows are used repeatedly, and the n is a positive integer;
    arranging each of $2^n$ columns of error positions adjacent, which in a same column have an identical number; and
    initializing the error rows as zero (0).

3. The method as defined in claim 1, wherein the step (b) comprises:
    setting the error buffer register file to include an error distribution buffer register file and an error accumulation buffer register file, wherein the error distribution buffer register file is sufficient to store all of the error distribution values from all of the relative pixels of a certain position in the error rows, and current relative pixels are set as all of pixels in a current operating row, whose error values are distributed to the certain position in the error rows, wherein the error accumulation buffer register file is sufficient to store all of relative accumulated error values of original error rows following the current operating row, and the relative accumulated error values are set as all of read original accumulated error values in the error rows in a course from reading out the original accumulated error value of a certain position in the error rows to writing in a new accumulated error value of the position; and initializing the error buffer register file, wherein the error buffer register file is initialized as zero (0) at a time of starting to process each row.

4. The method as defined in claim 1, wherein the step (d) comprises:

synchronously reading the accumulated error values corresponding to a position of the current source pixel and a position in a next row and a same column out from the error row memory;

calculating a sum S of error values of the current source pixel, in light of the error buffer register file, wherein the error values come from a distribution of errors generated by all of preceding pixels in the same row; and obtaining a final value of the pixel by adding an original accumulated error value of the position corresponding to a current pixel, the S and the value of the current source pixel together and producing a final halftone dot by comparing the final value with a threshold.

5. The method as defined in claim 1, wherein the step (e) comprises:

obtaining values $D_j$ for all of adjacent pixels, which is caused by distribution of error generated by a current pixel, in light of a final value of the pixel and a threshold;

updating an error distribution value of each pixel in the error distribution buffer register file as the error distribution value of its next pixel and updating value of a last pixel as the value $D_j$;

updating an accumulated error value of each pixel in an error accumulation buffer register file as the accumulated error value of its next pixel and updating the accumulated error value of the last pixel as an original accumulated error value of the position which corresponds to the current pixel and is in a next row; and obtaining all of written data values in one column in the error rows in light of the error buffer register file and synchronously writing the written data values into the error row memory, wherein the written data value of a certain position in a column in the error rows equals to a sum of the original accumulated error value of the certain position and all of the error distribution values distributed to the certain position, which are stored in the error buffer register file.

6. An apparatus for producing frequency-modulation halftone dots, comprising:

an error row memory configured to store results of error diffusion during processing and configured to be organized in columns;

an error buffer register file configured to buffer intermediate error values, wherein the error row memory and the error buffer register file are configured to generate a final gray level of source pixels after the error diffusion;

a gray generation circuit coupled to the source pixels including a current source pixel;

a threshold comparison circuit connected to the gray generation circuit and configured to compare the final gray level with a threshold to produce final halftone dots;

an error generation circuit connected to the gray generation circuit and configured to work out current error distribution values in light of the threshold and the final gray level;

an error buffer register file control circuit configured to control update and output of the error buffer register file, wherein input of the error buffer register file control circuit comes from feedback of the error generation circuit, an error row control circuit, and the error buffer register file, wherein the error row control circuit is coupled to the error row memory and configured to generate read-write addresses, read-write controlling signals and read-write data for the error row memory, wherein the input of the error row control circuit comes from coordinates including current operating pixel, the error buffer register file control circuit and the error generation circuit.

7. The apparatus as defined in claim 6, wherein the error buffer register file comprises triggers and includes an error distribution buffer register file and an error accumulation buffer register file, wherein the error distribution buffer register file is sufficient to store all of the error distribution values from all of relative pixels of a certain position in the error rows, wherein current relative pixels are set as all of pixels in a current operating row, whose error values are distributed to the certain position in the error rows, wherein the error accumulation buffer register file is sufficient to store all of relative accumulated error values of original error rows following the current operating row, and wherein the relative accumulated error values are set as all of read out original accumulated error values in the error rows in a course from reading out the original accumulated error value of a certain position in the error rows to writing in a new accumulated error value of the position.

8. The apparatus as defined in claim 6, wherein the gray generation circuit comprises an adder, the input of the adder coming from the source pixels, current error values read out from the error rows, and current buffered error values in the error buffer register file.

9. The apparatus as defined in claim 6, wherein the error buffer register file control circuit comprises a number n of multiplexers, where n is the number of the registers in the error buffer register file, the input of the multiplexers comprises the current error distribution values, current accumulated error values and original values in the error buffer register file, and the output of the multiplexers is updated values of the registers in the error buffer register file.

10. The apparatus as defined in claim 6, wherein the error row control circuit comprises a read address register, a write address register, a read-write control circuit, and a write-in data generation circuit, the read address register and the write address register are generated by a column number of a current pixel, and the write-in data generation circuit comprises adders, the input of the adders coming from original accumulated error values, the current error distribution values, and relative buffered error values.

* * * * *